United States Patent [19]
Senninger et al.

[11] Patent Number: 6,114,482
[45] Date of Patent: Sep. 5, 2000

[54] PROCESS FOR THE CONTROLLED RADICAL POLYMERIZATION OR COPOLYMERIZATION OF (METH) ACRYLIC AND VINYL MONOMERS AND (CO) POLYMERS OBTAINED

[75] Inventors: Thierry Senninger, Hayange; Muriel Plechot, Orthez, both of France

[73] Assignee: Elf Atochem, S.A., Puteaux, France

[21] Appl. No.: 08/884,218

[22] Filed: Jun. 27, 1997

[30] Foreign Application Priority Data

Aug. 12, 1996 [FR] France .................................. 96 10125

[51] Int. Cl.⁷ ....................................................... C08F 4/06
[52] U.S. Cl. .......................... 526/172; 526/328; 526/341; 526/343; 526/344
[58] Field of Search ............................................... 526/172

[56] References Cited

U.S. PATENT DOCUMENTS

| | | | |
|---|---|---|---|
| 4,145,486 | 3/1979 | Haag et al. | 521/31 |
| 5,763,548 | 6/1998 | Matyjaszewski et al. | 526/135 |
| 5,807,937 | 9/1998 | Matyjaszewski et al. | 526/135 |

FOREIGN PATENT DOCUMENTS 0 265 091   4/1988   European Pat. Off. .

OTHER PUBLICATIONS

"Polymerization of Vinyl–and Ethynlferrocene", Simionescu et al., Makromol. Chem., 163, pp. 59–74, (1973).

Hargreaves, "The Initiation of Vinyl Polymerization by Tetrakis (Trialkyl–Phosphite) Nickel (O) Derivatives", *J. of Polymer Science* (Part A: Polymer Chem.), vol. 26, pp. 465–476, 1988.

*Primary Examiner*—Bernard Lipman
*Attorney, Agent, or Firm*—Millen, White, Zelano & Branigan, P.C.

[57] ABSTRACT

This process is characterized in that at least one of the said monomers is polymerized or copolymerized in bulk, solution, emulsion or suspension at a temperature which may be as low as 0° C., in the presence of an initiator system comprising at least one radical-generator compound other than an arenesulphonyl chloride; and at least one catalyst consisting of a metal complex represented by the following formula (I): $Ma_a(L)_n$ in which: M represents Ni, Pd or Pt; A represents a halogen or a pseudohalide; the groups L are ligands of the metal M, which are chosen independently from those containing at least one from among N, P, As, Sb, and Bi, it being possible for at least two of these ligands to be connected together by one or more divalent radicals; a is an integer from 1 to 5; n is an integer from 1 to 4; with $4 \leq a+n \leq 6$, a+n representing the coordination number of the complex.

23 Claims, No Drawings

PROCESS FOR THE CONTROLLED RADICAL POLYMERIZATION OR COPOLYMERIZATION OF (METH) ACRYLIC AND VINYL MONOMERS AND (CO) POLYMERS OBTAINED

CROSS-REFERENCE TO RELATED APPLICATIONS

This application is related to commonly assigned concurrently filed applications entitled: Process for the Controlled Radical (Co)Polymerization of (Meth)Acrylic and Vinyl Monomers in the Presence of an Fe, Ru or Os Complex and (Co)Polymers Obtained (Attorney Docket No. CHAIL 21), based on French Application No. 96/10634 filed Aug. 30, 1996, by Thierry SENNINGER et al.; Process for the Controlled Radical Polymerization or Copolymerization of St (Meth)Acrylic, Vinyl, Vinylidene and Diene Monomers, and (Co)Polymers Obtained (Attorney Docket No. CHAIL 23), based on French Application No. 96/16049 filed Dec. 26, 1996, by Thierry SENNINGER et al.; and Process for the Controlled Radical (Co)Polymerization of (Meth)Acrylic, Vinyl, Vinylidene and Diene Monomers in the Presence of an Rh, Co, CO or Ir Complex (Attorney Docket No. CHAIL 24), based on French Application No. 96/13571, by Philippe DUBOIS et al.

FIELD OF THE INVENTION

The present invention relates to a process for the controlled radical polymerization or copolymerization of (meth) acrylic and/or vinyl (for example vinylaromatic) monomers, as well as to the polymers or copolymers thus obtained.

BACKGROUND OF THE INVENTION

Radical polymerization constitutes one of the polymerization processes which is most frequently exploited industrially on account of the variety of polymerizable monomers, the ease of implementation and the ease of the synthetic processes employed (bulk, emulsion, solution or suspension polymerization). However, it is difficult in standard radical polymerization to control the polymer chain size and the molecular mass distribution. Materials consisting of these macromolecules thus do not have controlled physiochemical properties. Furthermore, standard radical polymerization does not lead to block copolymers.

Ionic or coordinative polymerizations make it possible themselves to control the process of addition of the monomer, but they require careful polymerization conditions, in particular a high level of purity of the monomer and of the reactants, as well as an inert atmosphere.

The aim is to be able to carry out radical polymerizations which afford better control over the various parameters mentioned above and which can lead to block copolymers.

The concept used for controlling the polymerization involves redox reactions for transferring atoms or groups of atoms reversibly. The metal complex oscillates permanently between two oxidation states during the polymerization. This concept has been widely exploited in organic chemistry and was discovered by Kharasch in 1947 with the addition of polyhalomethanes to olefins.

The following systems have been used successfully to control the polymerization:

$RuCl_2(PPh_3)_3$ in the presence of an aluminium derivative: this type of system, which involves an aluminium derivative, is sensitive to oxygen and to moisture.

CuCl/bipyridine: copper systems work at high temperatures, for example above 100° C. for styrene.

With bipyridine as ligand, the complex is insoluble in the monomer. In order to achieve dissolution, it is necessary to use substituted bipyridines, such as dinonylbipyridine.

At the present time, few articles make reference to nickel complexes in order to control the radical polymerization. However, mention may be made of:

Van Koten complexes, which are organometallic complexes of nickel (thus possessing a metal-carbon bond); they have the drawback of having a long preparation which involves several synthetic steps, in particular that of the starting ligand; furthermore, they are oxygen-sensitive and must therefore be employed under anaerobic conditions.

nickel reduced to oxidation state (0) has been used in the presence of alkyl halides (Otsu, T. *Chem. Express* 1990, 5, 801 or Otsu, T. *J. Macromol. Sci. Chem.* 1969, 3, 177) in order to carry out a live polymerization of methyl methacrylate, but bimodal distributions are obtained. Similarly, activated nickel metal may serve as an initiator in the presence of alkyl halide (Otsu, T. *J. Polym. Sci., Polym. Lett.* 1967, 5, 697 or Otsu, T. *J. Polym. Sci. Part A1*, 1970, 8, 785) in order to polymerize methyl methacrylate, but no live nature is mentioned.

Other complexes of nickel in oxidation state (0), such as $Ni\{P(OR)_3\}_4$ (Hargreaves, K. *J. Polym. Sci. Polym. Chem.* 1988, 26, 465) or $Ni[CO]_4$ (Bamford, C. H. *Trans. Farad. Soc.* 1970, 66, 2598) have been tested in the presence of alkyl halides as initiators of vinyl monomers, but no mention is made of live nature.

Complexes of the type $NiX_2(PPh_3)_2$ have been used to carry out the Kharasch addition (Inoue, Y. *Chem. Lett.* 1978, 367) but not to carry out the controlled radical polymerization. Percec et al. in *Macromolécules* 1996, 29, 3665–3668 cite these complexes for carrying out the Kharasch addition, and mention that with arenesulphonyl chlorides, the polymerization of styrene is not controlled. No mention is made of good control (and thus live nature) of the polymerization with this complex and a radical generator, in particular an alkyl halide such as $CBrCl_3$.

SUMMARY OF THE INVENTION

The aim of the present invention is achieved by a process for the controlled radical polymerization or copolymerization of (meth)acrylic and/or vinyl monomers, characterized in that at least one of the said monomers is polymerized or copolymerized in bulk, solution, emulsion or suspension at a temperature which may be as low as 0° C., in the presence of an initiator system comprising:

at least one radical-generator compound other than an arenesulphonyl chloride; and at least one catalyst consisting essentially of a metal complex represented by formula (I) below:

$$MA_a(L)_n \qquad (I)$$

in which:

M represents Ni, Pd or Pt;

A represents a halogen or a pseudohalide;

the groups L are ligands of the metal M, which are chosen independently from those containing at least one from among N, P, As, Sb, and Bi, it being possible for at least two of these ligands to be connected together by one or more divalent radicals;

a is an integer from 1 to 5;

n is an integer from 1 to 4;

with $4 \leq a+n \leq 6$, a+n representing the coordination number of the complex.

M preferably represents Ni.

A represents a halogen chosen in particular from Cl, Br, F and I, or a pseudohalide chosen in particular from CN, NCS, $NO_2$ and $N_3$.

The geometry of the complex of formula (I) may be square-base or square-planar pyramidal, tetrahedral or octahedral. The present complexes are thus such that $4 \leq a+n \leq 6$, preferably equal to 4.

The divalent radicals which may connect the ligands L may be, for example, an alkylene radical, such as methylene (—$CH_2$—), ethylene (—$CH_2CH_2$—) or trimethylene (—$CH_2CH_2CH_2$—) radicals, which may themselves be substituted, for example with a $C_1$–$C_{14}$ alkyl or aryl group.

The ligands may be chosen independently from phosphines, arsines, stibines, phosphites, nitrogen-containing ligands and mixed ligands containing both phosphorus and arsenic or phosorus and nitrogen, it being possible for all of these ligands to contain at least one hetero element such as O or S.

A phosphine ligand may be a monophosphine PRR'R", R, R' and R" each independently representing a $C_1$–$C_{14}$ alkyl group which may be substituted with $SO_3^-$, COOH, alkoxy, alkyl-S—, or an aromatic group which may be substituted with at least one substituent chosen in particular from halogen, such as Cl, Br or F, alkyl, $CF_3$, alkoxy, $NO_2$ or $SO_3^-$, it being possible for at least one of R, R' and R" to be a halogen such as Cl, Br or to represent H, and it being possible for at least two of these ligands to be connected with at least one divalent radical to form a polyphosphine which may contain at least: one hetero atom, such as N, P, S or O.

Examples of optionally substituted alkyl groups falling within the definition of R, R' and R", which may be mentioned are methyl, ethyl, n-propyl, n-butyl and $NCCH_2CH_2$—, and examples of optionally substituted aromatic groups which may be mentioned are phenyl, 1-naphthyl, p-$FC_6H_4$, m-$ClC_6H_4$, o-$CH_3OC_6H_4$, p-$CF_3C_6H_4$, 2,4,6-trimethoxyphenyl, $C_6F_5$, o-$CH_3C_6H_4$, p-$CH_3C_6H_4$, m-$CH_3C_6H_4$.

Mention may also be made of monophosphines bearing groups intended to make them soluble, such as sodium triphenylphosphine monosulphonate (TPPMS) or sodium triphenylphosphine trisulphonate (TPPTS):

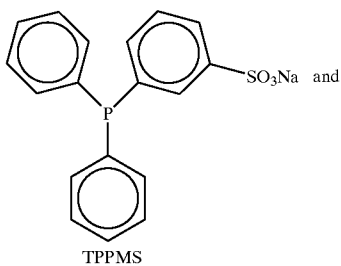

TPPMS

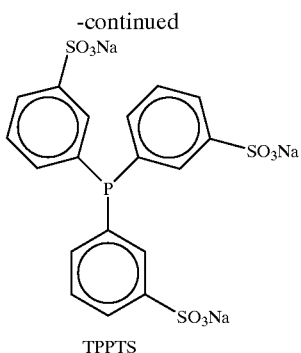

TPPTS chiral monophosphines, such as (S)-(+)-neomenthyldiphenylphosphine ((S)-NMDPP) (CAS Number=43077-29-8).

Mention may also be made of O—SMe—$C_6H_4$—P—$Ph_2$, as well as O—SMe—$C_6H_4$—PPh—$C_6H_4$—O—SMe.

Polyphosphines which may be mentioned are the compounds of the following general formula:

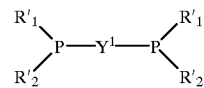

in which:
$R'_1$ and $R'_2$ each independently represent alkyl, substituted alkyl, alkyl bearing a —COOH or —$NH_2$ function, aryl or substituted aryl, such as $C_6H_5$;
$Y^1$ represents:
  alkylene; substituted alkylene;
  arylene; substituted arylene
  binaphthyl;
  1,2-cyclopentyl;
  $(CR'_3R'_4)_n$—Z—$(CR'_5R'_6)_m$—, with $R'_3$ to $R'_6$ each independently representing H or alkyl; n and m each representing an integer from 0 to 3; and Z=—C—C—, pyridyl or phenylene;

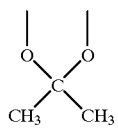

$[(CR'_7R'_8)_p$—T]q—$(CR'_9R'_{10})_r$, with $R'_7$ to $R'_{10}$ each independently representing H or alkyl; p, q and r representing an integer from 1 to 5, and T=—O—; —S—; —$NR'_{11}$—; —$PR'_{12}$ ($R'_{11}$, $R'_{12}$=$C_1$–$C_{14}$ alkyl, aryl);

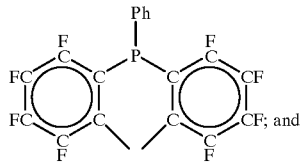

—$C_6H_5$—CH=CH—$C_6H_5$—.

Mention may be made in particular of:

diphosphines such as, for example:

$Me_2PCH_2CH_2PMe_2$ $Ph_2PCH_2PPh_2$ $Ph_2PCH_2CH_2PPh_2$ $Ph_2P(CH_2)_nPPh_2$, n=3 to 14

$(C_6F_5)_2PCH_2CH_2P(C_6F_5)_2$ chiral diphosphines capable of providing stereospecificity to the polymerization, such as:
- (4R,5R)-(−)-O-isopropylidene-2,3-dihydroxy-1,4-bis (diphenylphosphino)butane ((R,R)-DIOP) (CAS Number=37002-48-5);
- (4S,5S-(+)-O-isopropylidene-2,3-dihydroxy-1,4-bis (diphenylphosphino)butane ((S,S)-DIOP);
- (R)-(+)-2,2'-bis(diphenylphosphino)-1,1'-binaphthyl ((R)-BINAP) (CAS Number=76189-55-4);
- (S)-(−)-2,2'-bis(diphenylphosphino)-1,1'-binaphthyl ((S)-BINAP) (CAS Number 76189-56-5);
- (2S,3S)-(−)-bis(diphenylphosphino)butane ((S,S)-CHIRAPHOS) (CAS Number 648976-28-2);
- (2S,4S)-(−)-2,4-bis(diphenylphosphino)pentane ((S,S)-BDPP) (CAS Number=77876-39-2);
- R-(+)-1,2-bis(diphenylphosphino)propane ((R)-PROPHOS) (CAS Number =67884-32-6);

diphosphines represented by the formulae:

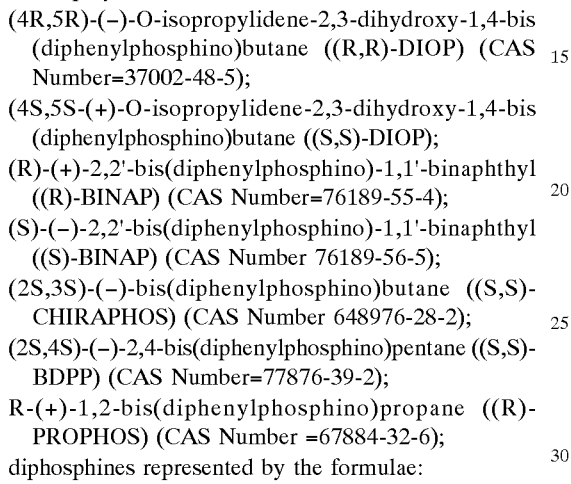

diphosphines containing hetero atoms, such as, for example:

$Ph_2PCH_2CH_2OCH_2CH_2PPh_2$;

$Ph_2PCH_2CH_2OCH_2CH_2OCH_2CH_2PPh_2$;

$Ph_2(CH_2COOH)PCH_2CH_2P(CH_2COOH)Ph$;

$Ph_2P(CH_2)_nS(CH_2)_mS(CH_2)_pPPh_2$;
(n, m and p each independently representing 2 or 3);

diphosphines of formula:

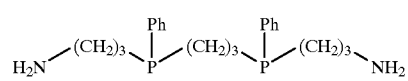

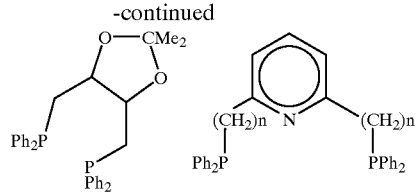

triphosphines, such as those of formulae:

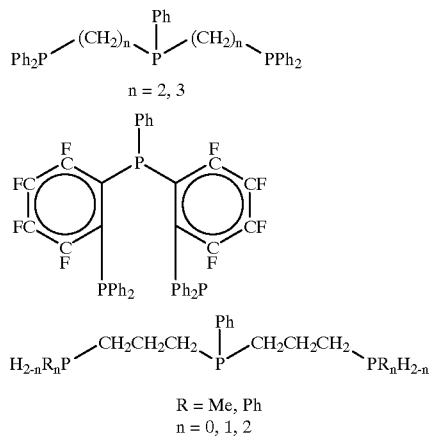

with $PPh_2$ possibly being replaced by PPhMe or $PMe_2$.

Mention may also be made of:

arsines such as:

$MePhAsC_2H_4AsPhMe$ $MePhAsC_3H_6AsPhMe$ cis-$Me_2AsC_2H_2AsMe_2$ trans-$Me_2AsC_2H_2AsMe_2$

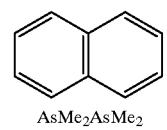

$AsMe_2AsMe_2$ stibines such as $Me_2SbCH_2CH_2CH_2SbMe_2$;

mixed ligands such as:

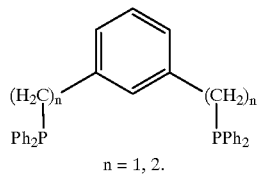

n = 1, 2.

The ligands comprising both P and As may be:

$Ph_2PCH_2CH_2AsPh_2$

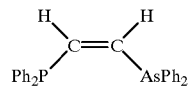

-continued

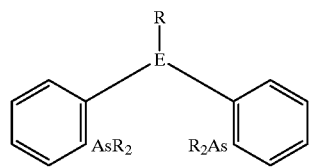

E = As; R = Ph
E = P; R = Ph
E = As; R = Me

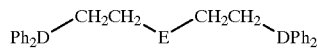

E = O; D = As
E = S; D = As
E = O; D = P
E = S; D = P

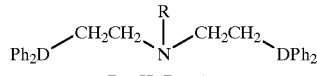

R = H; D = As
R = H; Me, Ph,
Cy; D = P

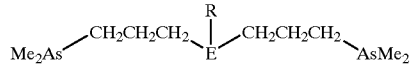

ER = AsMe
ER = PPh
ER = AsPh
ER = AsCH$_2$CH$_2$Cl

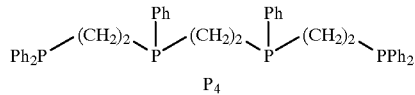

P$_4$

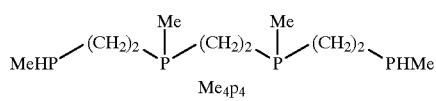

Me$_4$p$_4$

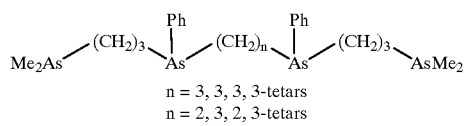

n = 3, 3, 3, 3-tetars
n = 2, 3, 2, 3-tetars

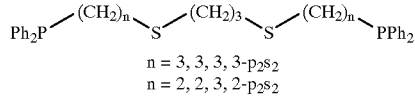

n = 3, 3, 3, 3-p$_2$s$_2$
n = 2, 2, 3, 2-p$_2$s$_2$

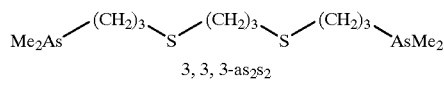

3, 3, 3-as$_2$s$_2$

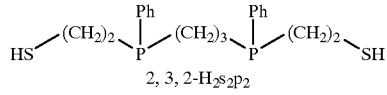

2, 3, 2-H$_2$s$_2$p$_2$

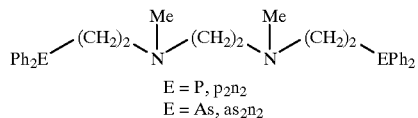

E = P, p$_2$n$_2$
E = As, as$_2$n$_2$

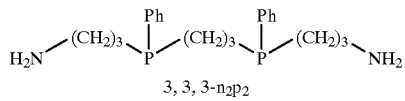

3, 3, 3-n$_2$p$_2$

-continued

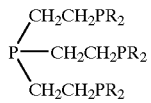

R = Ph
R = CH$_2$CMe$_3$

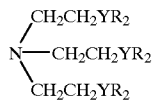

YR$_2$ = PPh$_2$
YR$_2$ = AsPh$_2$
YR$_2$ = PMe$_2$
YR$_2$ = AsMe$_2$
YR$_2$ = PEt$_2$
YR$_2$ = PCy$_2$

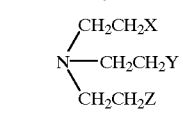

X = Y = PPh$_2$; Z = NEt$_2$
X = Y = AsPh$_2$; Z = NEt$_2$
X = Y = NEt$_2$; Z = PPh$_2$
X = Y = NEt$_2$; Z = AsPh$_2$
X = Y = AsPh$_2$; Z = OMe
X = CH$_2$OMe; Y = Z = PPh$_2$
X = OMe; Y = Z = PPh$_2$

Mention may be also be made of nitrogen-containing ligands such as Schiff bases having a C=N bond, such as:

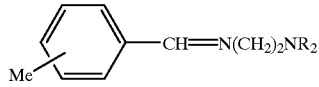

or two C=N bonds, such as:

with:

R$_1$ to R$_4$ each chosen from alkyl and aryl; and n=1 to 10, for example

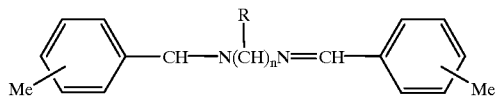

Mention may also be made of the complexes formed by tridentate Schiff bases:

| Ligands | Complex | Coordination number |
| --- | --- | --- |
| ![pyridine bis-imine ligand, R=Me pdai, R=NH₂ pdah] | [Ni(pdai)₂]I₂·H₂O<br>[Ni(pdah)₂]I₂ | 6<br>6 |
| ![dapi/daph ligand with Me groups] | [Ni(dapiR₂)X₂]<br>R = Me, Et, Pr$^n$, Pr$^i$, Bu$^s$, Cy; X = Cl, Br<br>R = Bu$^s$, Cy, Ph; X = NO₃, NCS<br>[Ni(daphR)₂]X₂<br>R = NH₂; X = Cl, I<br>R = NHMe; X = I, ClO₄<br>R = NMe₂; X = ClO₄<br>R = NHPh; X = ClO₄<br>[Ni(daphR)Cl₂]<br>R = NHMe, NHPh<br>R = NMe₂ | <br>5<br>6<br><br>6<br>6<br>6<br>6<br><br>5<br>5 |
| ![bis(pyridylmethyl)amine type ligand, R = alkyl] | NiL₂(ClO₄)₂<br>NiL'₂ (L' = (deprotonated ligand)<br>NiLX₂<br>X = Cl, NCS<br>X = Br, I | 6<br>6<br>6<br>5 |
| ![pyridyl hydrazone ligand, R = alkyl] | NiL₂(ClO₄)₂<br>NiL₂' (L' = (deprotonated ligand) | 6<br>6 | as well as the following ligands:

| Ligands | Complex | Coordination number |
| --- | --- | --- |
| ![tris(2-pyridyl)amine tpa ligand] | [Ni(tpa)₂](ClO₄)₂ | N₆ |

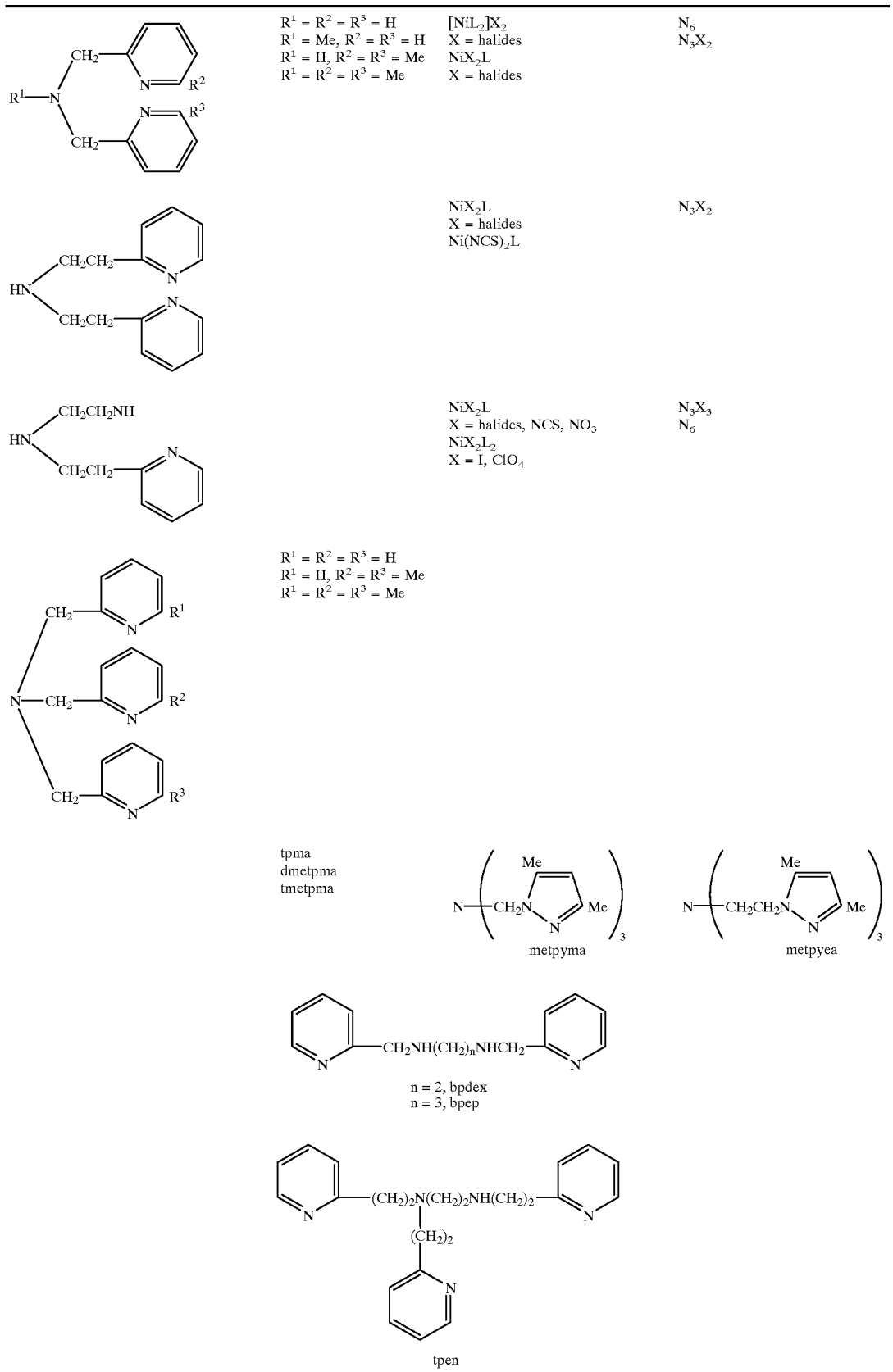

-continued

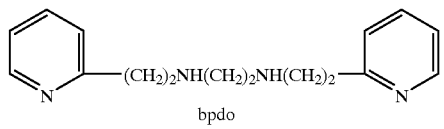
bpdo

Mention may also be made of the compounds of formula:

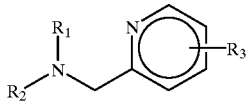

in which:

either $R_1$ represents:

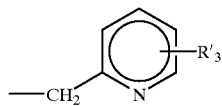

$R_2$ then representing the radical:

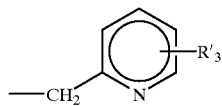

$R_3$, $R'_3$ and $R''_3$ each independently representing H, $C_1$–$C_4$ alkyl, $C_1$–$C_4$ alkoxy or halogen, or $R_1$ represents:

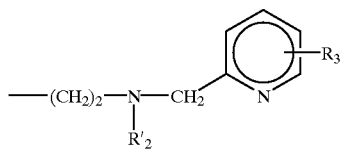

$R_2$ and $R'_2$ then being identical and representing a group chosen from hydrogen, $C_1$–$C_4$ lower alkyl, $C_1$–$C_4$ alkoxy and halogen.

The ligands may also be chosen from the family of phosphites P(OR)(OR')(OR''), with, for example R, R' and R'' chosen independently from n-butyl, isopropyl, ethyl, methyl, $(CH_3)_3CCH_2$- and $C_6H_4$.

The ligands, such as the phosphines, may be example, triphenylphosphine may be grafted onto a styrene-divinylbenzene copolymer.

Examples of compounds (I) which may be mentioned are $NiX_2(PPh_3)_2$ and

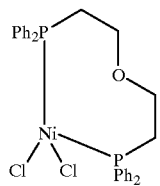

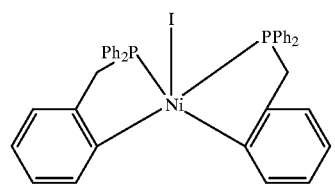

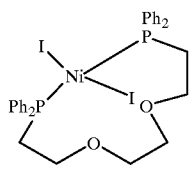

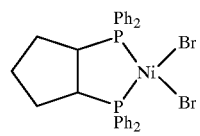

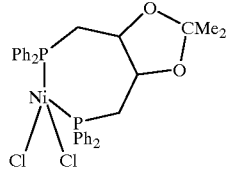

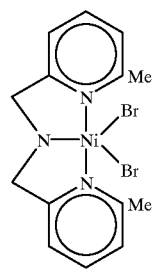

R = $CH_2CO_2H$
R' = $CH_2CO_2$ $NiX_2(PPh_3)_2$ is a particularly preferred complex since it is not sensitive to water or to oxygen and therefore does not require drastic polymerization conditions, such as those employed, for example, with catalysts of Ziegler-Natta type. Furthermore, these products are simple, inexpensive and readily commercially available. The complex is easy to prepare and only requires two reactants—Ni salt and phosphine—to be placed together (Acta Chem Scand. 1949, 3, 474). The preparation is even simpler when the phosphine is not pyrophoric, as is the case with triphenylphosphine.

The complex of the formula (I) may moreover bear a cationic charge which makes it more able to coordinate the monomers, especially polar monomers. This cationic charge may be provided by extraction of a halo ligand, for example using $AgBPh_4$, $AgBF_4$, $TlBF_4$ or $TlBPh_4$ or alternatively $AgB(C_6F_5)_4$ or $AgCF_3SO_3$.

Since the catalyst does not act as a radical generator, it is thus essential to combine it with such a compound. The reaction between the radical generator and the metal species M described above gives rise to a controlled polymerization. A polymerization may thus be continued by adding a fresh dose of a monomer, which may be different from the first. If this monomer is different from the first, and if it is added after the first has been consumed (or up to a high conversion of about 80–100%, preferably 95%), a block copolymer will be obtained. If it is added at the same time as the first, the copolymerization will be random and a random copolymer will be obtained. For the preparation of block copolymers, it may be envisaged to use a mixture of two or more catalysts, the second dose of monomer being added in the presence of a different catalyst but still of the type as defined in the context of the present invention, this catalyst then needing to be more active than the one already present. This operation may be repeated in this way at each new sequence which it is desired to prepare.

According to the invention, radical-generator compounds that are particularly suitable are halo compounds activated by electron-donating and/or electron-withdrawing effects on the carbon atom in the position a to the halogen or halogens of the said compound, in particular those indicated below:

when the radical generator is monofunctional, it may be chosen from the following classes of compounds:

(a) derivatives of formula:

where:

Y=Cl, Br, I, F, H or —$CR^1R^2OH$, $R^1$ and $R^2$ each independently representing hydrogen or $C_1$–$C_{14}$ alkyl; and Z=Cl or Br, for example, carbon tetrachloride, chloroform, carbon tetrabromide, bromotrichloromethane and 2,2,2-tribromoethanol;

(b) derivatives of formula:

where $R^3$ represents a phenyl group; benzyl group; benzoyl group; alkoxycarbonyl group; $R^4CO$ with $R^4$ representing $C_1$–$C_{14}$ alkyl or aryl; alkyl group; mesityl group; trifluoromethyl group; or nitro group, such as, for example, α,α,α-trichlorotoluene, α,α,α-trichloroacetophenone, ethyl trichloroacetate, 1,1,1-trichloroethane, 1,1,1-trichloro-2-phenylethane, trichloromethylmesitylene, 1,1,1-trichloro-2,2,2-trifluoroethane and trichloronitromethane;

(c) derivatives of formula:

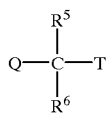

in which:

Q represents a chlorine or bromine atom or an acetate

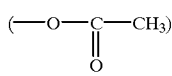

or trifluoroacetate

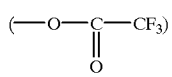

or triflate ($O_3SCF_3$) group;

RS represents a hydrogen atom, a $C_1$–$C_{14}$ alkyl group or an aromatic group of the benzene, anthracene or naphthalene type, for example, or a —$CH_2OH$ group;

T represents a group

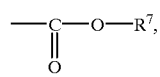

with $R^7$ each representing hydrogen or an alkyl or aromatic group; a CN group; a group

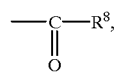

with $R^8$ representing $C_1$–$C_{14}$ alkyl, phenyl or isocyanate; a hydroxyl group; a nitro group; a substituted or unsubstituted amino group; a $C_1$–$C_{14}$ alkoxy group; a group $R^9CO$, with $R^9$ representing $C_1$–$C_{14}$ alkyl or aryl;

$R^6$ represents a group falling within the definitions of $R^5$ or of Q or a functional group such as hydroxyl, nitro, substituted or unsubstituted amino, $C_1$–$C_{14}$ alkoxy, acyl, carboxylic acid or ester;

such as, for example, 2-bromopropionic acid, 2-bromobutanoic acid, 2-bromohexanoic acid, ethyl 2-bromo-2-methylpropionate, bromoacetonitrile, 2-bromopropionitrile, 2-bromoisobutyrophenone and chloroacetyl isocyanate; 2-bromo-2-nitro-1,3-propanediol and 2-bromo-2-nitropropane;

(d) α-halo lactone or lactam compounds such as α-bromo-α-methyl-γ-butyrolactone or α-bromo-γ-valerolactone, halogenated lauryllactam or halogenated caprolactam;

(e) N-halosuccinimides, such as N-bromosuccinimide, and N-halophthalimides, such as N-bromophthalimide;

(f) alkylsulphonyl halides (chlorides and bromides), the alkyl residue being $C_1$–$C_{14}$ in particular;

(g) compounds of the formula:

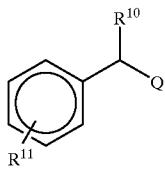

where:

$R^{10}$ represents a hydrogen atom, a $C_1$–$C_{14}$ alkyl group or a carboxylic acid, ester, nitrile or ketone group;

$R^{11}$ represents a hydrogen atom or a $C_1$–$C_{14}$ alkyl, hydroxyl, acyl, substituted or unsubstituted amine, nitro, $C_1$–$C_{14}$ alkoxy or sulphonate ($SO_3^-Na^+$ or $K^+$) group; and Q has the meaning given above;

(h) compounds of formula:

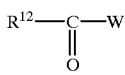

where:

$R^{12}$ represents $C_1$–$C_{14}$ alkyl or aryl; and

W represents a halogen, preferably Cl and Br, or a pseudohalide such as $N_3$ or SCN;

(i) compounds of formula:

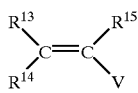

where:

$R^{13}$, $R^{14}$ and $R^{15}$ each independently represent $C_1$–$C_{14}$ alkyl or aryl; and V represents a halogen, preferably such as Cl or Br, or also an acetate, trifluoroacetate or triflate group; and (j) aromatic halides of formula:

where:

Ar represents an aromatic group such as $C_6H_5$— which may be substituted in the meta, ortho or para position with an electron-withdrawing group, such as $NO_2$, $NO_3$ or $SO_3$, or an electron-donating group, such as an alkyl group or an —ONa group; and U represents a halogen, preferably such as Cl or Br.

It may also be envisaged to use difunctional radical generators and generators of higher functionality; the difunctional radical generators may consist of two monofunctional radical generators $A^1$ and $A^2$ derived from the abovementioned classes (c) to (j), connected by a chain of methylene units or by a benzene ring or by a combination of the two, as represented by the formulae:

$A^1$—$(CH_2)_p$—$A^2$ with p being an integer from 1 to 14, and

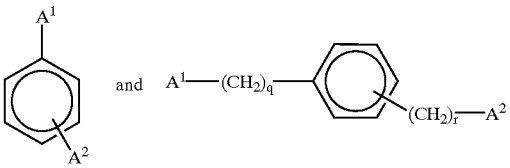

with q and r each independently representing an integer from 1 to 14.

In the case where $A^1$ and $A^2$ are derived from the class (c), the difunctional radical generators may be represented by the formula:

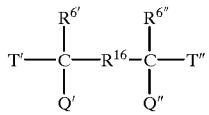

in which:

T' and T" each independently represent a group falling within the definition of T;

Q' and Q" each independently represent a group falling within the definition of Q $R^{6'}$ and $R^{6''}$ each independently represent a group falling within the definition of $R^6$; and $R^{16}$ represents a group —$(CH_2)_p$—,

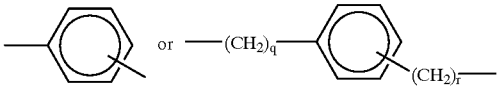

as defined above.

Mention may be made, for example, of the difunctional initiators of formulae:

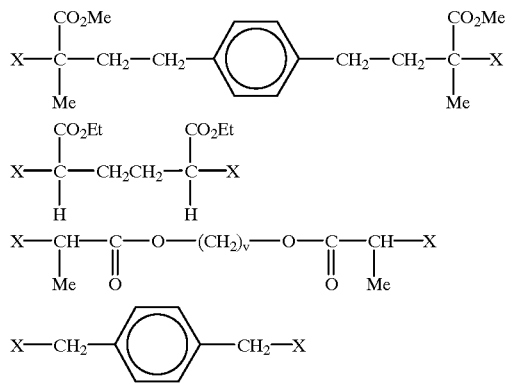

with X=halogen, such as Br and Cl; and v=integer from 1 to 10.

The use of a difunctional initiator allows the preparation of triblock copolymers of A(b)B(b)A type, by firstly synthesizing the central difunctional block, which serves to initiate the polymerization of the monomer A.

The multifunctional radical-generator compounds may consist of at least three monofunctional radical-generator groups $A^1$, $A^2$ and $A^3$ derived from the abovementioned classes (c) to (j) connected together by a benzene ring, such as, for example, those corresponding to the formula:

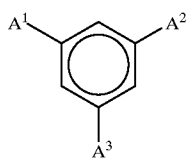

Other difunctional radical-generator compounds are tri- or tetrahalomethanes and trichloromethyl derivatives of the abovementioned classes (a) and (b), it also being possible for these same tri- and tetrahalomethanes to serve as multifunctional radical-generator compounds.

Difunctional radical-generator compounds other than those represented above may also be used, in particular those of the acetic anhydride family such as chloroacetic anhydride and chlorodifluoroacetic anhydride.

In accordance with a particular embodiment of the present invention, the radical generators may also be polylactones, such as polycaprolactones, for example poly(ε-caprolactones), bearing a halogen atom, such as bromine, at one of the chain ends, since these have been obtained by polymerization by opening the ring with alkoxides or carboxylates bearing halogen atoms. Thus, it is possible to use, for example, a-halo alcohol, for example tribromoethanol (Example 13) which has reacted beforehand with a proton abstractor such as, for example, a trialkylaluminium (trimethylaluminium, triethylaluminium or triisopropylaluminium) or an aluminium alkoxide (aluminium triethoxide). The halo carboxylates may also serve to initiate the polymerization of the lactones, as is taught in Comprehensive Polymer Science, Volume 3, Pergamon Press, 1st edition, 1989, page 463. The lactones may be, for example, ε-caprolactone, β-propiolactone or α,α'-bis (chloromethyl)-β-propiolactone.

The use of such polylactones, activated with a catalyst according to the invention, makes it possible to prepare specific block polymers, as illustrated by Example 13 below.

Since the polymer chain length is predetermined by the molar ratio of the (meth)acrylic or vinyl monomer or monomers to the radical-generator compound or compounds, this ratio is from 1 to 100,000, advantageously from 50 to 2000. As regards the molar ratio of the metal M to the radical generator(s), it is generally between 0.01 and 100, advantageously between 0.01 and 20.

The parameter of the polymerization or copolymerization temperature is an extremely important point which distinguishes the process of the invention from the processes currently known using catalytic systems. With the known catalytic processes, the catalyst becomes inactive below a temperature of about 100° C. in the absence of activator. Thus, at 50° C., no polymerization takes place with the CuCl/2,2-bipyridine catalyst, and, in the absence of activator, with the catalyst $RuCl_2(PPh_3)_3$, even after reacting for several days. Within the context of the present invention, it is possible to speak of mild reaction conditions, since it is very uncommon for catalysts in synthesis to remain active at temperatures which may be as low as 0° C. at atmospheric pressure. This advantage is extremely important, all the more so since the stereocontrol of the polymerization or copolymerization reaction is promoted by lowering the temperature. Moreover, bulk reaction conditions (that is to say in the pure monomer or monomers) and solution, emulsion or suspension reaction conditions are generally identical. The temperature and all the molar ratios may be the same irrespective of the reaction process used. The possibility of working, without risk, in the pure monomer obviously constitutes an improvement over standard radical polymerizations. Since the concentration of active centres is constant throughout the polymerization or copolymerization reaction on account of the absence of termination reactions, the large and violent exothermicity (or Trommsdorf effect) of standard radical polymerizations does not occur. For the industrial process, this clearly constitutes important progress since polymerizations or copolymerizations carried out under these conditions no longer risk running totally out of control. In general, the polymerization or copolymerization will be carried out at a temperature of from 0° C. to 130° C., advantageously between 40 and 90° C., without any loss of activity of the catalyst.

Since the initiator systems according to the invention are compatible with water, the polymerization or copolymerization reactions may thus be carried out in aqueous medium, in the presence or absence of emulsifiers. Accordingly, the polymerizations in aqueous medium are carried out either in suspension (water-insoluble radical-generator compound) or in emulsion (water-soluble radical-generator compound) in the presence of emulsifiers. The emulsifiers may be anionic surfactants, such as sodium dodecylbenzenesulphonate, sodium dodecyl sulphate, sodium lauryl sulphate and mixtures thereof, or of the neutral type, such as glycol esters, esters of sorbitan and of polyethylene glycol, such as the monolaurate, monopalmitate, oleate and stearate of sorbitan and of polyethylene glycol, fatty acid esters of polyethylene glycol such as polyethylene glycol stearate, and fatty alcohol ethers of polyethylene glycol such as the stearyl and cetyl ethers of polyethylene glycol.

When they are carried out in solution, the polymerization or copolymerization reactions of the invention may, obviously, also be carried out in the presence of an organic solvent or a mixture of organic solvents belonging to the following families of solvents:

aromatic hydrocarbons (apolar aprotic): benzene, toluene, ethylbenzene, xylene;
chlorinated hydrocarbons (polar aprotic): methylene chloride, chlorobenzene;
ethers such as diphenyl ether
cyclic ethers (polar aprotic): tetrahydrofuran, dioxane;
esters (polar): ethyl acetate, cyclohexyl acetate;
ketones (polar): methyl ethyl ketone, cyclohexanone.
A chlorinated solvent may be used if it does not interact, or interacts only very little, with compound (I), so as not to give interfering radicals.

The abovementioned organic solvents are particularly suitable when the monomers to be polymerized or copolymerized are acrylic monomers (methacrylates, acrylates, acrylonitrile) and vinylaromatic monomers such as styrene monomers.

In certain cases, in particular in the polymerization of n-butyl methacrylate and styrene, hexane and cyclohexane may be used, and in the polymerization of vinyl acetate and acrylonitrile, dimethylformamide, dimethyl sulphoxide, acetonitrile or acetone may be used.

In general, the polymerization and copolymerization process according to the invention takes place in an identical manner for the random homopolymerization and copolymerization. For the preparation of block copolymers, including star-shaped block copolymers, the experimental conditions may change during the addition of a monomer which is different from the first after the first monomer has been polymerized. For example, the temperature may be varied in either direction, it being possible for the second dose to be added with a solvent. For the preparation of macromonomers or of α,ω-functionalized polymers (telechelic polymers), the same type of variation in the experimental conditions may be envisaged.

As monomers which may be polymerized and copolymerized in the presence of the polymerization or copolymerization initiator system proposed, mention may be made of (meth)acrylic and vinyl (vinylaromatic, vinyl esters such as vinyl acetate, vinyl chloride) monomers.

The initiator system according to the invention is also suitable for the (co)polymerization of optionally fluorinated olefin monomers, such as ethylene, butene, hexene and 1-octene. Monomers containing conjugated double bonds, such as butadiene and isoprene, are also suitable for the (co)polymerization.

For the purposes of the present invention, the term acrylic monomer is understood to refer to a monomer chosen from primary, secondary and tertiary alkyl acrylates in which the alkyl group, which may be substituted, for example, with at least one halogen atom such as fluorine, and/or at least one hydroxyl group, contains 1 to 18 carbon atoms, mention being made more particularly of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate, as well as phenyl acrylate, isobornyl acrylate, alkylthioalkyl or alkoxyalkyl acrylates, acrylonitrile and dialkylacrylamides.

For the purposes of the present invention, the term methacrylic monomer is understood to refer to a monomer chosen from alkyl methacrylates in which the alkyl group, which may be substituted, for example, with at least one halogen atom such as fluorine and/or at least one hydroxyl group, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, β-hydroxyethyl, hydroxypropyl or hydroxybutyl methacrylate, as well as glycidyl methacrylate, norbornyl methacrylate, methacrylonitrile and dialkylmethacrylamides.

For the purposes of the present invention, the term vinylaromatic monomer is understood to refer to an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

According to the invention, it has been observed that, by careful combination of a metal complex as defined above with a polymerization radical-generator compound, random and block homopolymers and copolymers that are fully defined and controlled may be obtained, as well as star-shaped copolymers and α,ω-functionalized (telechelic) macromonomers and polymers which it has not been possible hitherto to synthesize by standard radical polymerization processes.

The invention thus also relates to the polymers or copolymers as obtained by the abovementioned process, of controlled molecular masses and of narrow polydispersity.

The polymers and copolymers of (meth)acrylic and vinyl monomers as obtained by the process of the invention have molecular masses $\overline{Mn}$ of between 400 and 10,000,000 g/mol and a particularly narrow polydispersity $\overline{Mw}/\overline{Mn}$, which is less than 2, generally less than 1.5, being between 1.05 and 1.5. In the context of radical polymerization, this constitutes important progress since, until only very recently, it was inconceivable to obtain molecular mass distributions or polydispersities $\overline{Mw}/\overline{Mn}$ of less than 1.5. Furthermore, the process of the invention is extremely regioselective, that is to say that it allows excellent control over the orientation of the monomer units during propagation. Moreover, the chains orient themselves exclusively head-to-tail and no longer head-to-head, as might have been the case in standard radical polymerization. This promotes the thermal stability of the polymers and copolymers thus prepared. The absence of termination reactions removes any other possibility of head-to-head alignment.

By comparison with the known processes of ionic and radical polymerization and copolymerization, the process of the present invention has the following advantages:

homogeneous and live polymerization. The polymerization is live according to the criteria generally put forward: linear change in the average masses as a function of the conversion, linear change in ln(1/(1 conversion)) as a function of time, resumption of the polymerization after addition of a fresh dose of monomer (Penczek, S. in Makromol. *Chem. Rapid. Commun.* 1991, 12, 77)

excellent molecular control: $\overline{Mw}/\overline{Mn}$ narrow up to about $\overline{Mw}/\overline{Mn}=1.1$; good correlation between the theoretical $\overline{Mn}$ and the experimental $\overline{Mn}$; possibility of preparing block copolymers, including star-shaped copolymers;

quantitative polymerization leading to total consumption of the monomer;

mild temperature conditions ranging from 0° C. to 130° C. and ordinary pressure;

the reaction time depends on the concentration of the reaction medium. This is because, the lower the concentration of monomer, the slower will be the polymerization kinetics. In concentrated medium ([monomer]>6 mol $1^{-1}$), the polymerization may be terminated in less than two hours. In more dilute medium, the polymerizations are generally stopped after reacting for 24 hours;

compatibility in aqueous media since the catalysts used do not degrade in the presence of water. Possibility of emulsion and suspension polymerization, in the presence or absence of emulsifiers, the use of soluble phosphines such as, for example, $(Na^+O_3SC_6H_4)_3P)$ making it possible to dissolve the complex in the aqueous phase;

possibility of stereocontrol, that is to say of controlling the hetero-, syndio- or isotacticity by using chiral catalysts;

excellent control of the synthesis of the polymers or copolymers obtained, the molecular masses of which range between 400 and 10,000,000 g/mol;

the resistance to thermal degradation of the polymers and copolymers is improved on account of the absence of termination reactions (combinations and disproportionations) which may be shown in particular by thermogravimetric analysis;

production of novel products that are difficult to access by the usual polymerization techniques, such as pure block copolymers, defined random copolymers and hyper-branched polymers which can be used as adhesives of controlled formulation, shockproof additives, emulsifiers and interface agents;

production of materials with improved properties; the absence of terminal double bonds makes it possible to increase the depolymerization temperature of the polymers, in particular of PMMA;

controlled polymerization which makes it possible to avoid the auto-acceleration of the polymerization (known as the gel effect or Trommsdorf effect). The control of the polymerization by the nickel complex makes it possible to avoid the sudden auto-acceleration of the polymerization after very rapid setting (see Comparative Example 6). This phenomenon is generally harmful for the manufacturer and the product. In particular, for PMMA which needs to be in the form of cast plates, it is important for the polymerization to be controlled in order to avoid the appearance of bubbles or defects at the surface of the plate. The gel point may be avoided by using suitable, sometimes long, temperature cycles. A single temperature is preferably used, which is a simplification for the process.

Non-limiting examples describing the preparation of polymers as obtained according to the process of the present invention are given below.

The values $\overline{Mn}_{exp}$ and $\overline{Mw/Mn}$ are obtained in the following way: steric exclusion chromatography (SEC) is carried out, which makes it possible to separate the polymer macromolecules according to their size in solution (hydrodynamic volume). They are then eluted by a solvent (THF mobile phase) for the polymer. The larger molecules come off first and the smaller molecules come off last since they take a longer path through the pores of the column (stationary phase). PMMAs of known absolute masses (determined by another technique) are also injected (standards) and make it possible to obtain a calibration curve, from which the relative molecular masses ($\overline{Mn}_{exp}$) of the polymer whose size and mass distribution or polydispersity ($\overline{Mw/Mn}$) it is desired to determine are obtained.

EXAMPLE 1

Polymerization of Methyl Methacrylate(MMA)

30.0 g of MMA, 0.15 g of bromotrichloromethane ($7.5 \times 10^{-4}$ mol) and 0.563 g ($7.5 \times 10^{-4}$ mol) of nickel complex $NiBr_2(PPh_3)_2$ are introduced, at room temperature and under an intert atmosphere, into a test tube fitted with a screw-cap and a Teflon joint. The tube is placed in an oil bath maintained at 70° C. and is stirred by a to-and-fro motion. After 1197 minutes, the tube is removed from the oil bath. The polymer is recovered after breaking the tube.

| Conversion | 100% |
|---|---|
| $\overline{Mn}_{exp}$ | 26,750 g/mol (PMMA standard) |
| $\overline{Mn}_{theor}$ | 40,000 g/mol |
| $\overline{Mw/Mn}$ | 1.6 |

EXAMPLE 2

Polymerization of N-Butyl Acrylate

The process is performed as for Example 1, but at a temperature of 130° C. with 30.0 g of n-butyl acrylate, 0.150 g ($7.5 \times 10^{-4}$ mol) of bromotrichloromethane and 0.563 g ($7.5 \times 10^{-4}$ mol) of nickel complex $NiBr_2 (PPH_3)_2$. The polymerization is stopped after 1185 minutes.

| Conversion | 100% |
|---|---|
| $\overline{Mn}_{exp}$ | 26,750 g/mol (PMMA standard) |
| $\overline{Mn}_{theor}$ | 31,520 g/mol |
| $\overline{Mw/Mn}$ | 1.9 |

EXAMPLE 3

Comparative

The process is performed as in Example 1, but the polymerization of the MMA is initiated with α,α'-azobisisobutyronitrile (AIBN—CAS=78-67-1). 30.0 g of MMA and 0.0615 g of AIBN ($3.7 \times 10^{-4}$ mol) are mixed together. The polymerization is stopped after 120 min.

| Conversion | 100% |
|---|---|
| $\overline{Mn}_{exp}$ | 99,780 g/mol (PMMA standard) |
| $\overline{Mn}_{theor}$ | 40,000 g/mol |
| $\overline{Mw/Mn}$ | 9.9 |

EXAMPLE 4

Polymerization of MMA

A solution, prepared at room temperature and under an inert atmosphere, containing 300.0 g of MMA, 1.50 g of bromotrichloromethane ($7.5 \times 10^{-3}$ mol) and 5.63 g of $NiBr_2(PPh_3)_2$ ($7.5 \times 10^{-3}$ mol) is introduced, at 70° C. and under a nitrogen atmosphere, into a 2 l stainless-steel reactor fitted with an anchor-shaped paddle stirrer and a temperature control system. The instant at which the mixture reaches a temperature of 70° C. is defined as the starting point of the test. Samples are taken over time. This makes it possible to calculate the conversion into polymer obtained after evaporation under vacuum (25 mbar, 140° C., 20 min) of the monomer remaining in a sample.

The results are given in Table 1.

TABLE 1

| t (min) | Conversion (%) | Mn (g/mol) | $\overline{Mw/Mn}$ | ln(1/1-Conversion) |
|---|---|---|---|---|
| 0 | 0 | 0 | — | 0.00 |
| 30 | 10.5 | 3485 | 1.2 | 0.11 |
| 70 | 17.4 | 5960 | 1.3 | 0.19 |
| 100 | 21.4 | 7219 | 1.3 | 0.24 |
| 180 | 33.1 | 11,940 | 1.4 | 0.40 |
| 235 | 42.0 | 15,880 | 1.3 | 0.54 |
| 280 | 48.4 | 16,750 | 1.4 | 0.66 |
| 310 | 52.1 | 18,830 | 1.4 | 0.74 |
| 340 | 56.5 | 21,560 | 1.3 | 0.83 |
| 370 | 60.4 | 22,480 | 1.4 | 0.93 |

| Conversion | 60.4% |
|---|---|
| $\overline{Mn}_{exp}$ | 22,480 g/mol (PMAA standard) |
| $\overline{Mn}_{theor}$ | 24,160 g/mol |
| $\overline{Mw/Mn}$ | 1.4 |

The linear change in the average masses $\overline{Mn}_{exp}$ as a function of the conversion, as well as in the ln(1/(1—conversion)) as a function of time, shows that the system is live.

EXAMPLE 5

Polymerization of MMA

The process is performed as in Example 4, with 300.0 g of MMA and 1.50 g of bromotrichloromethane ($7.5 \times 10^{-3}$ mol), but with 2.81 g of $NiBr_2(PPh_3)_2$ ($3.8 \times 10^{-3}$ mol). The results are given in Table 2.

TABLE 2

| t (min) | Conversion (%) | $\overline{Mn}_{exp}$ (g/mol) | $\overline{Mw}/\overline{Mn}$ | ln(1/(1-Conversion)) |
|---|---|---|---|---|
| 0 | 0 | 0 | — | 0.0 |
| 60 | 6.6 | — | — | 0.07 |
| 120 | 10.2 | 4336 | 1.2 | 0.12 |
| 180 | 17.0 | — | — | 0.19 |
| 300 | 25.5 | 9773 | 1.2 | 0.29 |
| 400 | 34.8 | 12,710 | 1.3 | 0.43 |
| 500 | 40.4 | 13,760 | 1.5 | 0.52 |

| | |
|---|---|
| Conversion | 40.4% |
| $\overline{Mn}_{exp}$ | 13,160 g/mol (PMMA standard) |
| $\overline{Mn}_{theor}$ | 16,160 g/mol |
| $\overline{Mw}/\overline{Mn}$ | 1.5 |

A linear change in the average masses $\overline{Mn}_{exp}$ as a function of the conversion and in the ln(1/(1—conversion)) as a function of time are again observed.

EXAMPLE 6

Comparative

The bulk polymerization of MMA (300.0 g) is initiated using AIBN (0.616 g, $3.7 \times 10^{-3}$ mol) at 70° C. in a 2-liter reactor.

The results are given in Table 3.

TABLE 3

| t (min) | Conversion (%) | $\overline{Mn}_{exp}$ (g/mol) | $\overline{Mw}/\overline{Mn}$ | ln (1/1(1-X)) |
|---|---|---|---|---|
| 0 | 0 | 0 | — | 0.00 |
| 15 | 8.7 | 48,240 | 4.6 | 0.09 |
| 30 | 34.5 | 50,370 | 3.8 | 0.42 |
| 35 | 42.0 | 67,120 | 3.2 | 0.54 |
| | | exothermic up to 110° C. | | |
| 40 | 100.0 | 65,970 | 2.8 | |

| | |
|---|---|
| Conversion | 100% |
| $\overline{Mn}_{exp}$ | 65,970 g/mol (PMMA standard) |
| $\overline{Mn}_{theor}$ | 40,000 g/mol |
| $\overline{Mw}/\overline{Mn}$ | 2.8 |

The polymerization auto-accelerates rapidly. It is not live, as shown by the curve which may be plotted: in (1/(1−X) as a function of time, or alternatively the curve which may be plotted: $\overline{Mn}_{exp}$ as a function of the conversion, which curves are not linear.

EXAMPLE 7

Determination of the glass transition temperatures (Tg) of several PMMA samples

| Sample | Tg (° C.) |
|---|---|
| PMMA obtained by standard radical initiation | 114.8 |
| PMMA obtained by anionic initiation | 124.3 |
| PMMA of Example 4 | 123.7 |
| PMMA of Comparative Example 6 | 111.1 |

The glass transition temperature Tg (determined using a Differential Scanning Calorimetry technique with a rate of temperature increase of 10° C.) of the samples obtained by the controlled radical route is higher than that of samples prepared by a standard radical route.

EXAMPLE 8

Synthesis of a PMMA Bearing an Alcohol Function at the End of the Chain 0.0173 g of $NiBr_2(PPh_3)_2$ (0.023 millimol) and 0.013 g of 2,2,2-tribromoethanol (0.047 millimol) are introduced into a glass tube. The tube is closed with a three-way tap. The oxygen is removed by repetition of a vacuum/nitrogen cycle. 1.5 ml of toluene (degassed by bubbling nitrogen through) and 3 ml of MMA (28.05 millimol) are introduced into the tube using a flame-dried syringe. The tube is then placed in a bath which is thermostatically set at 75° C. After reacting for 47 hours, the tube is opened and the reaction medium is dissolved in THF before being precipitated from heptane.

| | |
|---|---|
| Conversion | 52% |
| $\overline{Mn}_{exp}$ | 37,200 g/mol (PMMA standard) |
| $\overline{Mn}_{theor}$ | 31,500 g/mol |
| $\overline{Mw}/\overline{Mn}$ | 1.34 |

EXAMPLE 9

Synthesis of a PMMA Bearing a Carboxylic Acid Function at the End of the Chain

The process is performed as in Example 8, but with:
0.52 g (0.07 mmol) of $NiBr_2(PPh_3)_2$;
0.53 g (0.14 mmol) of 2-bromopropionic acid;
0.5 ml of toluene; and
3 ml (28 mmol) of MMA.
The polymerization is stopped after 16 hours.

| | |
|---|---|
| Conversion | 93% |
| $\overline{Mn}_{exp}$ | 26,900 g/mol (PNMA standard) |
| $\overline{Mn}_{theor}$ | 18,900 g/mol |
| $\overline{Mw}/\overline{Mn}$ | 1.23 |

EXAMPLE 10

Synthesis of a Poly(N-Butyl Acrylate) (PnBuA) Bearing a Bromine Atom at Both Ends The process is performed as in Example 8, but at a temperature of 85° C., with:
0.664 g (0.089 mmol) of $NiBr_2(PPh_3)_2$;
0.0322 g (0.089 mmol) of diethyl meso-2,5dibromoadipate:

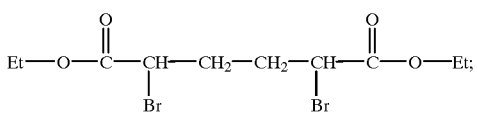

12 ml (83.7 mmol) of n-butyl acrylate.
The polymerization is stopped after 20 hours. The polymer is not precipitated, but the residual monomer is removed by evaporation under high vacuum.

| | |
|---|---|
| Conversion | 72% |
| $\overline{Mn}_{exp}$ | 86,600 g/mol (PMMA standard) |

-continued

| | |
|---|---|
| $\overline{Mn}_{theor}$ | 86,0000 g/mol |
| $\overline{Mw}/\overline{Mn}$ | 1.09 |

EXAMPLE 11

Repetition of the Polymerization of MMA Starting with a Precipitated PMMA

The process is performed as in Example 8, but with:
0.03 g (0.04 mmol) of $NiBr_2(PPh_3)_2$;
0.2 g of a PMMA synthesized with $NiBr_2(PPh_3)_2$ and ethyl 2-bromo-2-methylpropionate $(Br-C(CH_3)_2-CO-O-CH_2CH_3)$, and having an $\overline{Mn}_{exp}$ of 4770 and a polydispersity $\overline{Mw}/\overline{Mn}$ of 1.27; and
1.5 ml (14 mmol) of MMA.
The polymerization is stopped after 16 hours.

| | |
|---|---|
| Conversion | 71% |
| $\overline{Mn}_{exp}$ | 37,000 g/mol (PMMA standard) |
| $\overline{Mn}_{theor}$ | 28,700 g/mol |
| $\overline{Mw}/\overline{Mn}$ | 1.15 |

EXAMPLE 12

Repetition of the Polymerization of n-BuA starting with a precipitated PMMA

The process is performed as in Example 8, but at a temperature of 120° C., with
0.03 g (0.04 mmol) of $NiBr_2(PPh_3)_2$;
0.2 g of a PMMA synthesized with $NiBr_2(PPh_3)_2$ and ethyl 2-bromo-2-methylpropionate and having an $\overline{Mn}_{exp}$ of 4770 and a polydispersity $\overline{Mw}/\overline{Mn}$ of 1.27; and
2 ml (14 mmol) of n-butyl acrylate.
The polymerization is stopped after 16 hours.

| | |
|---|---|
| Conversion | 80% |
| $\overline{Mn}_{exp}$ | 30,000 g/mol (PMMA standard) |
| $\overline{Mn}_{theor}$ | 42,500 g/mol |
| $\overline{Mw}/\overline{Mn}$ | 2.17 |

EXAMPLE 13

Synthesis of a polycaprolactone functionalized with a tribromoethoxy group and using this polycaprolactone as a macroinitiator of MMA (formation of a poly(ε-caprolactone)-b-PMMA block copolymer)

(a) Synthesis of polycaprolactone 2,2,2-Tribromoethanol is dried by means of two azeotropes with toluene under an inert atmosphere of nitrogen. 2.262 g (8 mmol) of dry 2,2,2-tribromoethanol are reacted with 2 mmol of $Al(OiPr)_3$ in toluene. Two azeotropic distillations with toluene are carried out in order to remove the isopropyl alcohol. 5 grams of caprolactone (43.8 mmol) and 1.8 mmol of the presynthesized initiator are introduced in 30 ml of toluene. The mixture is left to react at 25° C. for 1 hour.

| | |
|---|---|
| Conversion | 86%, determined after precipitation of the polymer from heptane |
| Mn | 2,500 g/mol |
| $\overline{Mw}/\overline{Mn}$ | 1.1 |

(b) Use of this macroinitiator in the polymerization of MMA
The process is performed as in Example 8, but with:
0.045 g (0.06 mmol) of $NiBr_2(PPh_3)_2$;
0.15 g of poly(ε-caprolactone) obtained in (a);
0.3 ml of THF; and
1.2 ml (11.2 mmol) of MMA.
The polymerization is stopped after 15 hours.

| | |
|---|---|
| Conversion | >95% |
| $\overline{Mn}_{exp}$ | 25,000 g/mol (PMMA standard) |
| $\overline{Mn}_{theor}$ | 21,000 g/mol |
| $\overline{Mw}/\overline{Mn}$ | 1.2 |

EXAMPLE 14

Controlled Synthesis of a PMMA with a Catalyst/Initiator Ratio of 0.05

The process is performed as in Example 8, but with:
0.01 g (0.013 mmol) of $NiBr_2(PPh_3)_2$;
5 ml (47 mmol) of MMA; and
1.3 ml of a 0.2018M solution of ethyl 2-bromo-2-methylpropionate in toluene (0.26 mmol).
The polymerization is stopped after 120 hours.

| | |
|---|---|
| Conversion | 80% |
| $\overline{Mn}_{exp}$ | 30,700 g/mol (PMMA standard) |
| $\overline{Mn}_{theor}$ | 14,500 g/mol |
| $\overline{Mw}/\overline{Mn}$ | 1.46 |

EXAMPLE 15

Formation of a PMMA-b-P(nBuA)-b-PMMA Triblock Copolymer

The process is performed as in Example 8, but at a temperature of 85° C., with:
0.27 g (0.36 mmol) of $NiBr_2(PPh_3)_2$;
19.34 g of a difunctional PnBuA synthesized as in Example 10 ($\overline{Mn}_{exp}$=107,000 g/mol (PMMA standard); $\overline{Mw}/\overline{Mn}$=1.11);
80 ml of toluene; and
10 ml (93.5 mmol) of MMA.
The polymerization is stopped after 51 hours.

| | |
|---|---|
| Conversion | 45% |
| $\overline{Mn}_{exp}$ | 110,000 g/mol (PMMA standard) |
| $\overline{Mw}/\overline{Mn}$ | 1.33 |
| % of MMA determined by $^1$H NMR | 24% |

The preceding examples can be repeated with similar success by substituting the generically or specifically described reactants and/or operating conditions of this invention for those used in the preceding examples.

The entire disclosure of all applications, patents and publications, cited above, and of corresponding French application 96/10125, are hereby incorporated by reference.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A process for the controlled homogeneous live radical polymerization or copolymerization of (meth)acrylic and/or vinyl monomers, characterized in that at least one of the said monomers is polymerized or copolymerized in bulk, solution, emulsion or suspension in the presence of an initiator system comprising:

at least one radical-generator compound other than an arenesulphonyl chloride; and at least one catalyst consisting essentially of a metal complex represented by formula (I) below:

$$MA_a(L)_n \qquad (I)$$

in which:

M represents Ni, Pd or Pt;

A represents a halogen or a pseudohalide;

the groups L are ligands of the metal M, which are chosen independently from those containing at least one from among N, P, As, Sb, and Bi, and optionally at least two of these ligands are connected together by one or more divalent radicals;

a is an integer from 1 to 5;

n is an integer from 1 to 4;

with $4 \leq a+n \leq 6$, a+n representing the coordination number of the complex, so as to obtain head to tail polymers having a molecular mass $\overline{Mn}$ of 400–10,000,000 g/mol and a polydispersity $\overline{Mw}/\overline{Mn}$ less than 2 with a molecular control $\overline{Mw}/\overline{Mn}$ up to about 1.1.

2. A process according to claim 1, characterized in that M represents Ni.

3. A process according to claim 1, characterized in that A represents a halogen chosen from Cl, Br, F and I, or a pseudohalide chosen from CN, NCS, $NO_2$ and $N_3$.

4. A process according to claim 1, characterized in that a+n is equal to 4.

5. A process according to claim 1, characterized in that the ligands L are chosen independently from phosphines, arsines, stibines, phosphites, nitrogen-containing ligands and mixed ligands containing both phosphorus and arsenic or phosphorus and nitrogen, it being possible for all of these ligands to contain at least one hetero element such as 0 or S.

6. A process according to claim 1, characterized in that the complex of formula (I) bears a cationic charge.

7. A process according to claim 1, characterized in that the complex of formula (I) is the complex $NiX_2(PPh_3)_2$, X representing a halogen.

8. A process according to claim 1, characterized in that the free-radical-generator compound is monofunctional and chosen from-the following classes of compounds:

(a) derivatives of formula:

$$CYZ_3$$

where

Y=Cl, Br, I, F, H or $-CR^1R^2OH$, $R^1$ and $R^2$ each independently representing hydrogen or $C_1-C_{14}$ alkyl; and Z=Cl or Br;

(b) derivatives of formula:

$$R_3CCl_3$$

where $R^3$ represents phenyl; benzyl; benzoyl; alkoxycarbonyl; $R^4CO$ with $R^4$ representing $C_1-C_{14}$ alkyl or aryl; alkyl; mesityl; trifluoromethyl; or nitro, (c) derivatives of formula:

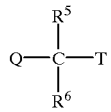

in which:

Q represents a chlorine or bromine atom or an acetate or trifluoroacetate or triflate group;

$R^5$ represents a hydrogen atom, a $C_1-C_{14}$ alkyl group or an aromatic group or a $-CH_2OH$ group;

T represents a group

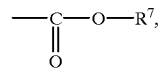

with $R^7$ each representing hydrogen or an alkyl or aromatic group; a CN group; a group

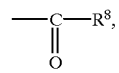

with $R^8$ representing $C_1-C_{14}$ alkyl, phenyl or isocyanate; a hydroxyl group; a nitro group; a substituted or unsubstituted amino group; a $C_1-C_{14}$ alkoxy group; a group $R^9CO$, with $R^9$ representing $C_1-C_{14}$ alkyl or aryl;

$R^6$ represents a group falling within the definitions of $R^5$ or of Q or a functional group such as hydroxyl, nitro, substituted or unsubstituted amino, $C_1-C_{14}$ alkoxy, acyl, carboxylic acid or ester;

(d) a-halo lactone or lactam compounds;

(e) N-halosuccinimides and N-halophthalimides;

(f) alkylsulphonyl halides;

(g) compounds of the formula:

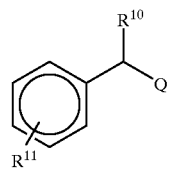

where:

$R^{10}$ represents a hydrogen atom, a $C_1-C_{14}$ alkyl group or a carboxylic acid, ester, nitrile or ketone group;

$R^{11}$ represents a hydrogen atom or a $C_1-C_{14}$ alkyl, hydroxyl, acyl, substituted or unsubstituted amine, nitro, $C_1-C_{14}$ alkoxy or sulphonate group; and Q has the meaning given above;

(h) compounds of formula

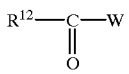

where:
R$^{12}$ represents C$_1$–C$_{14}$ alkyl or aryl;
W represents a halogen or pseudohalide;
(i) compounds of formula:

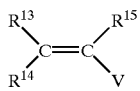

where:
R$^{13}$, R$^{14}$ and R$^{15}$ each independently represent C$_1$–C$_{14}$ alkyl or aryl; and
V represents halogen, acetate, trifluoroacetate or triflate;
(j) aromatic halides of formula:

where:
Ar represents an aromatic group such as C$_6$H$_5$—which may be substituted in the ortho, meta or para position with an electron-withdrawing or electron-donating group; and
U represents a halogen.

9. A process according to claim 8, characterized in that the radical-generator compound is bromotrichloromethane, 2,2,2-tribromoethanol, 2-bromopropionic acid, diethyl meso-2,5-dibromoadipate or ethyl 2-bromo-2-methylpropionate.

10. A process according to claim 1, characterized in that the radical-generator compound is multifunctional and comprises at least two monofunctional radical-generator groups derived from classes (c) to (j), connected by a chain of methylene units or by a benzene ring or by a combination of both, or is chosen from acetic anhydrides or chloroacetic anhydride or chlorodifluoroacetic anhydride, and tri- or tetrahalomethanes and trichloro-methyl derivatives of classes (a) and (b).

11. A process according to claim 10, characterized in that the radical-generator compound is difunctional and is chosen from those of formula:

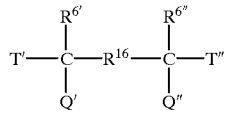

in which:
T' and T" each independently represent a group falling within the definition of T, as indicated in claim 8;

Q' and Q" each independently represent a group falling within the definition of Q, as indicated in claim 8;
R$^{6'}$, and R$^{6''}$ each independently represent a group falling within the definition of R$^6$, as indicated in claim 8; and
R$^{16}$ represents a group —(CH$_2$)$_p$—,
or

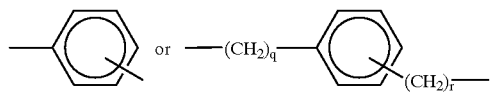

where p, q and r each represent an integer from 1 to 14.

12. A process according to claim 1, characterized in that the radical-generator compound is a polylactone, such as a polycaprolactone, bearing a halogen atom at one of its chain ends, which has been obtained by polymerization by opening the ring with a halo alkoxide or a halo carboxylate.

13. A process according to claim 1, characterized in that the molar ratio of the monomer or monomers to the radical-generator compound or compounds is from 1 to 100,000.

14. A process according to claim 1, characterized in that the molar ratio of the metal M to the radical-generator(s) is from 0.01 to 100.

15. A process according to claim 1, characterized in that the polymerization or copolymerization is carried out at a temperature of from 0° C. to 130° C.

16. A process according to claim 1, characterized in that the polymerizable or copolymerizable monomers comprise at least one monomer chosen from the group consisting of methacrylates, acrylates, vinylaromatic derivatives, vinyl acetate and vinyl chloride.

17. A process according to claim 16, characterized in that the monomer is chosen from the group consisting of methyl methacrylate, ethyl methacrylate, n-butyl methacrylate, acrylonitrile and styrene.

18. A process according to claim 1, characterized in that a block copolymerization is carried out by introducing, into the polymerization medium in which the first monomer has been polymerized, a second monomer with an optional further addition of initiator system.

19. A process according to claim 1, wherein said at least one radical-generator compound is bromotrichloromethane.

20. A process according to claim 19, wherein the catalyst is NiBr$_2$ (PPh$_3$)$_2$.

21. A process according to claim 8, wherein the catalyst is NiBr$_2$ (PPh$_3$)$_2$.

22. A process according to claim 15, carried out at a temperature of between 40 and 90° C.

23. A process according to claim 1, wherein the polydispersity is between 1.05 and 1.5.

* * * * *